United States Patent
Gentile

(10) Patent No.: US 12,448,980 B2
(45) Date of Patent: Oct. 21, 2025

(54) APPARATUS FOR SECURING A ROTATING FAN WITH ADJUSTABLE FASTENERS AND METHOD

(71) Applicant: Joseph P Gentile, Milton, GA (US)

(72) Inventor: Joseph P Gentile, Milton, GA (US)

( * ) Notice: Subject to any disclaimer, the term of this patent is extended or adjusted under 35 U.S.C. 154(b) by 0 days.

(21) Appl. No.: 18/427,798

(22) Filed: Jan. 30, 2024

(65) Prior Publication Data

US 2025/0243868 A1  Jul. 31, 2025

(51) Int. Cl.
*F04D 25/08* (2006.01)
*F04D 29/60* (2006.01)

(52) U.S. Cl.
CPC ......... *F04D 25/088* (2013.01); *F04D 29/601* (2013.01)

(58) Field of Classification Search
CPC ... F04D 25/088; F04D 29/601; F04D 25/0613
USPC ........................................................ 150/154
See application file for complete search history.

(56) References Cited

U.S. PATENT DOCUMENTS

| 7,056,053 | B2 * | 6/2006 | Schilling | F16B 43/02 |
| | | | | 411/537 |
| 7,874,798 | B2 * | 1/2011 | Frampton | F04D 25/088 |
| | | | | 416/246 |
| 2006/0186301 | A1 * | 8/2006 | Dozier | F16M 11/24 |
| | | | | 248/371 |
| 2009/0152426 | A1 * | 6/2009 | Longton | F16M 13/027 |
| | | | | 248/343 |
| 2020/0063759 | A1 * | 2/2020 | Ebersole | F04D 29/34 |
| 2020/0340712 | A1 * | 10/2020 | Leitch | F24S 25/33 |
| 2022/0205459 | A1 * | 6/2022 | Santolucito | F04D 25/062 |
| 2022/0243741 | A1 * | 8/2022 | Wang | F16M 13/027 |
| 2022/0282736 | A1 * | 9/2022 | Herkner | F04D 25/088 |

* cited by examiner

*Primary Examiner* — Essama Omgba
*Assistant Examiner* — Lilya Pekarskaya
(74) *Attorney, Agent, or Firm* — Steven C. Stewart

(57) ABSTRACT

A method and apparatus for supporting a rotating fan or other hanging structure is disclosed. The apparatus includes a first cylindrical tube that can be attached to the rotating fan, a first plate with elongated apertures for receiving slidable fasteners that engage with a rail lip, and a second plate coupled with a second cylindrical tube. The second cylindrical tube is perpendicular to the second plate and is designed to receive and retain the first cylindrical tube. The second plate has tongues that engage with the tongues on the first plate and forms apertures for receiving fasteners that engage with connectors. This apparatus provides a secure and stable support structure for a rotating fan, allowing for easy installation and maintenance.

9 Claims, 10 Drawing Sheets

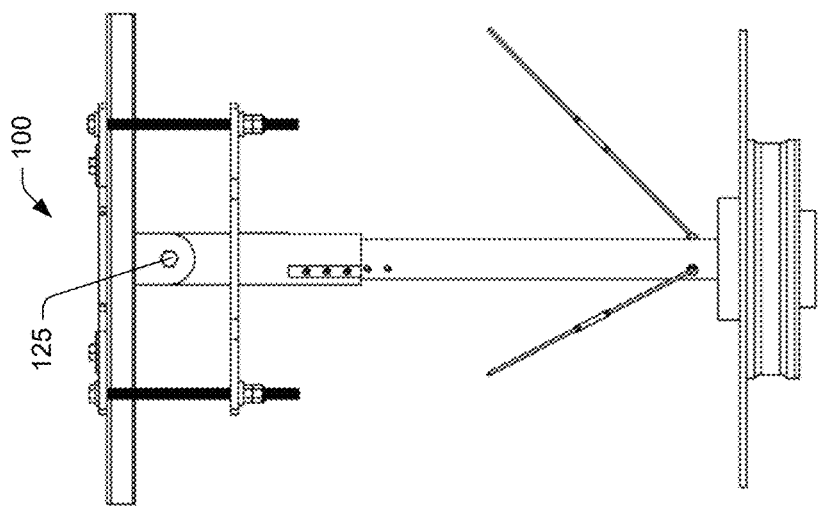
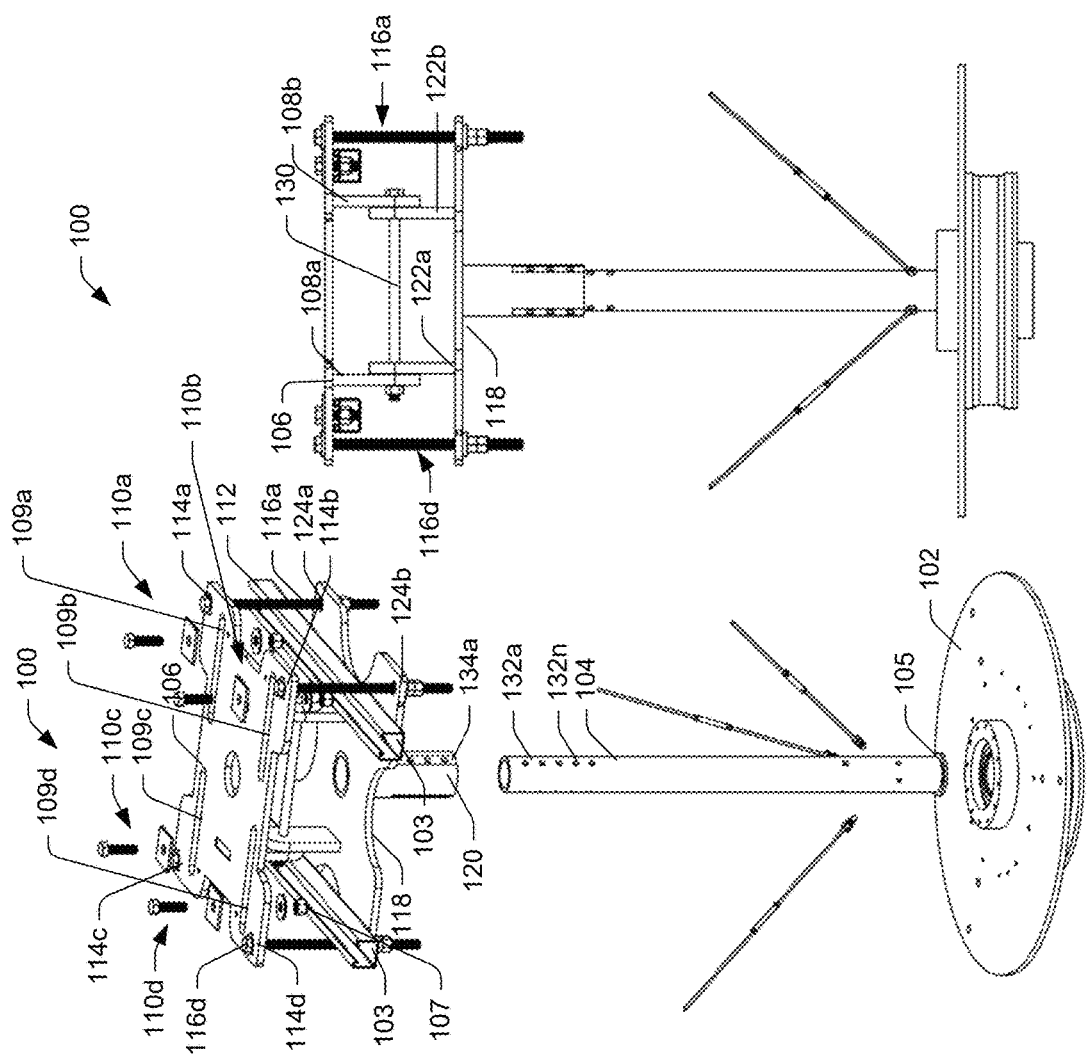
Fig. 1A    Fig. 1B    Fig. 1C

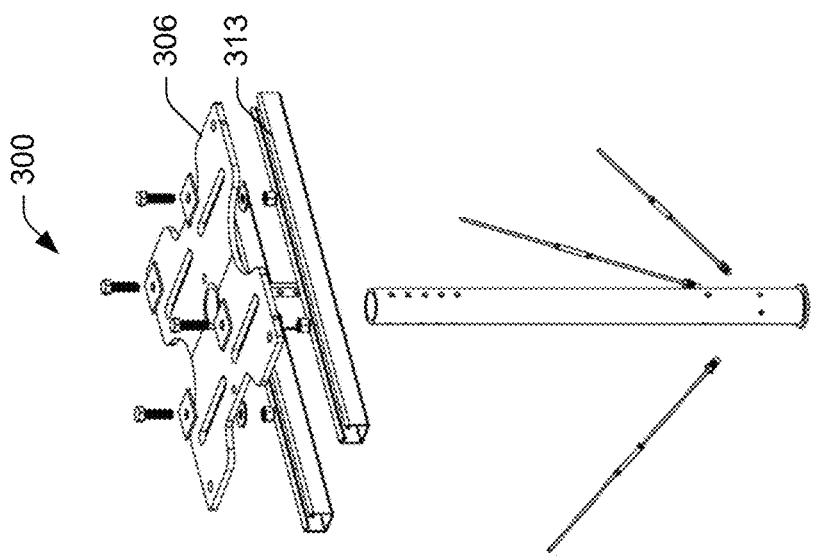
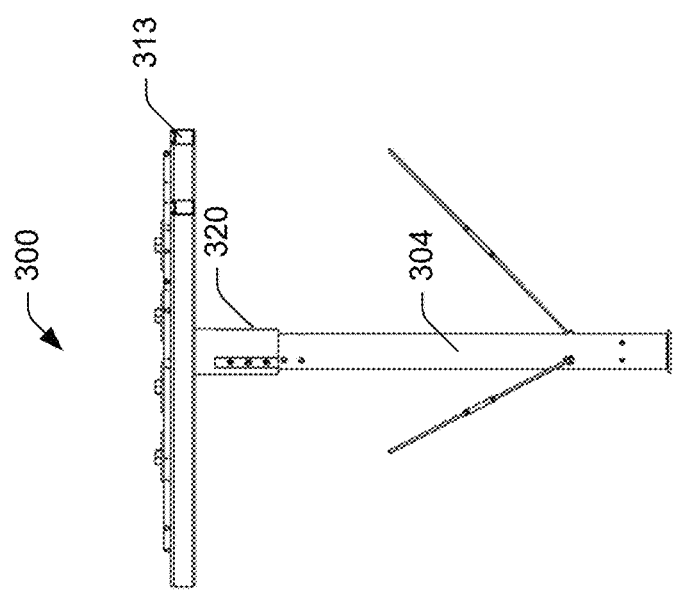
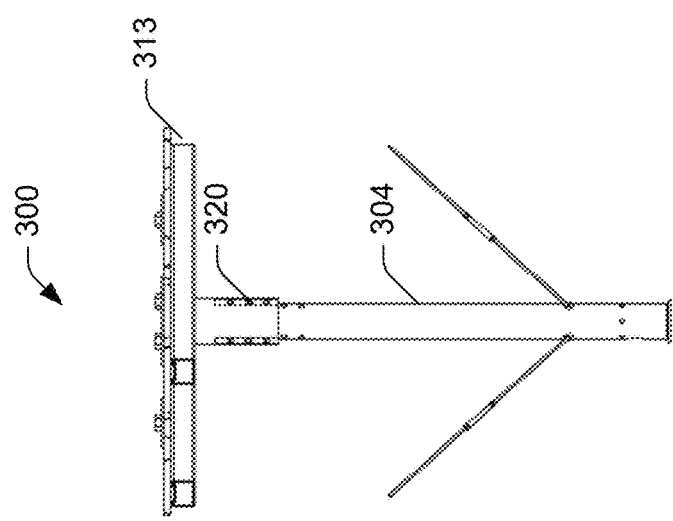

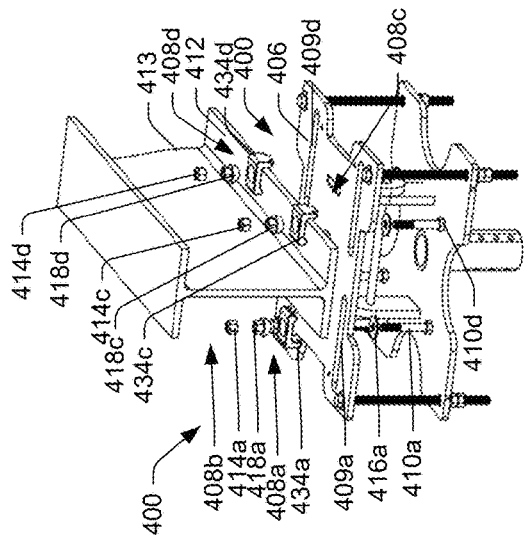
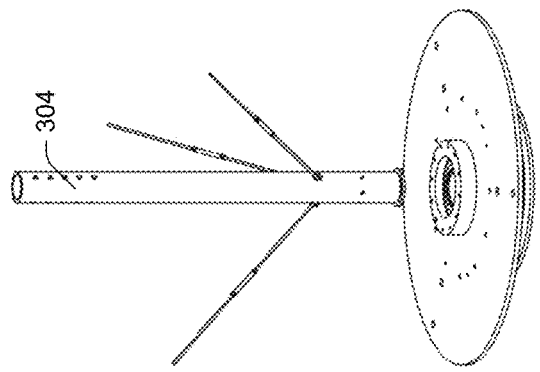
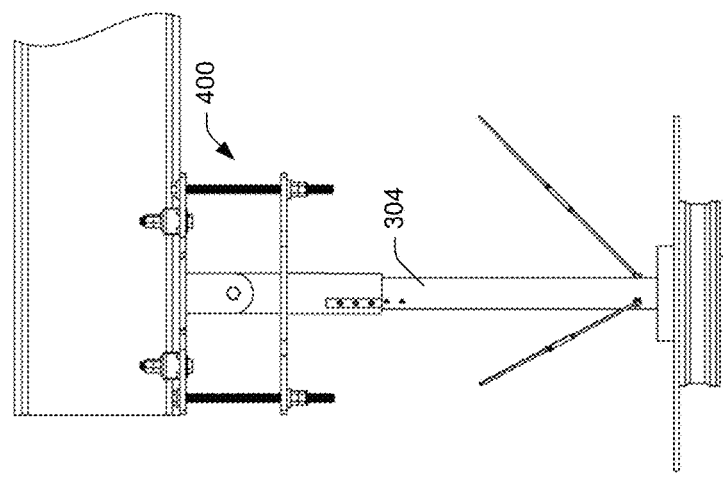
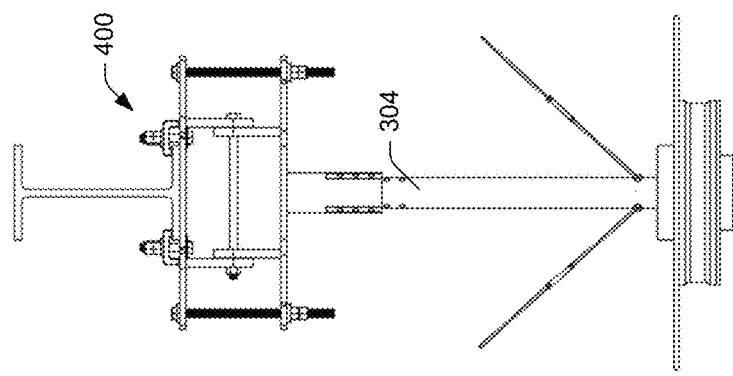
Fig. 4A  Fig. 4B  Fig. 4C

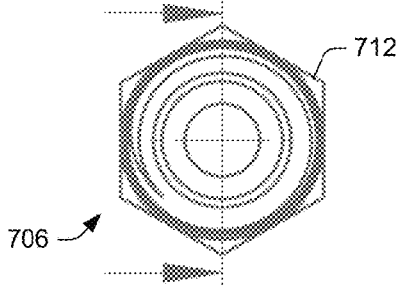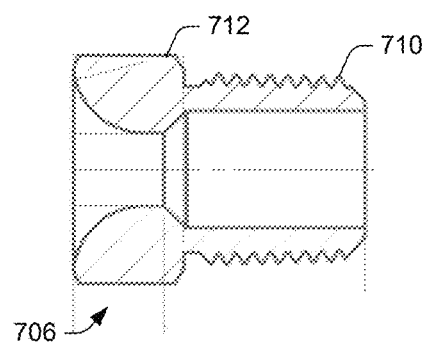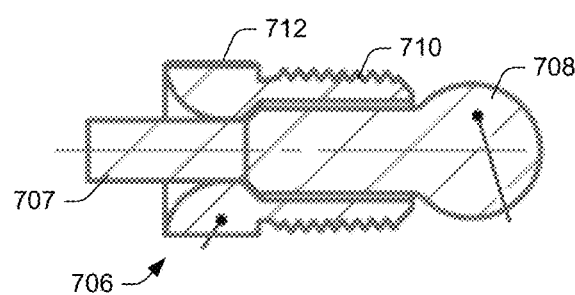

APPARATUS FOR SECURING A ROTATING FAN WITH ADJUSTABLE FASTENERS AND METHOD

TECHNICAL FIELD

These claimed embodiments relate to a method and apparatus for securing a hanging structure such as a rotating fan and more particularly to securing a rotating fan with adjustable fasteners.

BACKGROUND OF THE INVENTION

Fans have been attached to ceilings using fixed bolts or screws. However, the angle of the fan with respect to the ceiling or floor may need to be adjusted after mounting, while still providing support to a rotating fan. Current techniques are complicated requiring many moving parts or lead to wear over time.

Further guidewires need to be added to the ceiling attachment fans to reduce fan movement during operation. Current techniques require many parts for the guidewires or lead to unstable support of the fan.

Various approaches have been developed for supporting rotating fans in different applications. One common approach involves using brackets or mounting structures to secure the fan to a fixed surface. These brackets typically consist of a single plate or a combination of plates and tubes that are attached to the fan and then fastened to the surface using screws or other fasteners. While these brackets provide a stable support for the fan, they often lack flexibility in terms of adjustability and ease of installation.

Another approach involves using clamps or clips to attach the fan to a rail or a similar structure. These clamps or clips are designed to grip onto the fan and then slide onto the rail, allowing for easy installation and removal. However, these clamps or clips may not provide sufficient stability and may be prone to slipping or loosening over time, especially in high-vibration environments.

Additionally, some existing solutions utilize a combination of plates and tubes to create a more secure and adjustable support system for rotating fans. These solutions typically involve attaching a plate to the fan and then connecting it to a tube that can be adjusted in height or angle. While these solutions offer some level of adjustability, they may be complex and time-consuming to assemble, requiring multiple components and fasteners.

However, none of these approaches have provided a comprehensive solution that combines the features described in this disclosure. The present invention aims to address the limitations of the previous approaches by providing an apparatus for supporting a rotating fan that offers both stability and adjustability, while also being easy to install and assemble.

SUMMARY

In some aspects, the techniques described herein relate to an apparatus for supporting a rotating fan that includes a first cylindrical tube configured to be attached at one end to a rotating fan. A first plate forms a plurality of elongated apertures configured to receive a first plurality of slidable fasteners that engage with a lip of a rail, the first plate having a first plurality of tongues that extend perpendicular to the first plate and forming a plurality of circular apertures to receive a plurality of connectors. A second plate is coupled with a second cylindrical tube extending perpendicular to the second plate. The second cylindrical tube is configured to receive and retain the first cylindrical tube. The second plate has a second plurality of tongues extending perpendicular to the second plate and configured to engage with the first plurality of tongues. The second plate forms apertures configured to receive the fasteners that engage with the plurality of connectors.

In some aspects, the techniques described herein relate to an apparatus, wherein the first plurality of tongues each form an opening and the second plurality of tongues each form an opening. The first and second plurality of tongues are configured to engage with the first plurality of tongues by receiving a connector that extends through the openings of the first plurality of tongues and the second plurality of tongues.

In some aspects, the techniques described herein relate to an apparatus, wherein the plurality of connectors includes a screw and a bolt. The bolts of the plurality of connectors engage with the first plate and are configured to be tightened or loosened on the screw to change an angle of a plane of the first plate with respect to an angle of a plane of the second plate.

In some aspects, the techniques described herein relate to an apparatus, wherein the first cylindrical tube has a cylindrical lip attached at one end to support a rotating fan.

In some aspects, the techniques described herein relate to an apparatus, wherein the first cylindrical tube has a cylindrical lip attached at one end to support a rotating fan.

In some aspects, the techniques described herein relate to an apparatus for supporting a hanging structure with an I-beam including an elongated member configured to attach the hanging structure at one end of the at least one elongated member. A plate is coupled with another end of the at least one elongated member, the at least one elongate member configured to extend perpendicular to the plate and configured to receive and retain the hanging structure at another end of the at least one elongated member, the plate forming elongated apertures configured to receive a plurality of fasteners to secure the plate to the I-beam.

In some aspects, the techniques described herein relate to an apparatus for supporting the hanging structure with an I-beam, wherein at least one of the plurality of fasteners includes a Self-aligning clamp with a flat portion, a lower lip portion and an upper lip portion. The upper lip portion extends away from one end of the flat portion. An edge of the upper lip portion configured to engage with a flange of the I-beam. The lower lip portion extends away from the other end of the flat portion. An edge of the lower lip portion is configured to engage with a top surface of the plate.

In some aspects, the techniques described herein relate to an apparatus for supporting the hanging structure with an I-beam, wherein the lower lip portion and the upper lip portion extend in the same direction perpendicularly away from the flat portion.

In some aspects, the techniques described herein relate to an apparatus for supporting the hanging structure with an I-beam, wherein the edge of the lower lip portion extends away from the flat portion at a distance greater than the edge of the upper lip portion.

In some aspects, the techniques described herein relate to an apparatus for supporting the hanging structure with an I-beam, wherein the flat portion of the Self-aligning clamp includes a socket configured to receive a hemispherical washer, the socket and the hemispherical washer forming an aperture to receive a screw.

In some aspects, the techniques described herein relate to an apparatus for supporting the hanging structure with an I-beam, wherein the hemispherical washer includes a hemispherical shaped portion that engages with the socket, and wherein the hemispherical shaped portion is configured to pivot with respect to the flat portion within the socket.

In some aspects, the techniques described herein relate to an apparatus for supporting the hanging structure with an I-beam, wherein the hemispherical shaped portion is configured to orient of a pivot axis extending upward through the screw at a first angle with respect to flat portion to secure the plate to the I-beam with the upper lip portion and the low lip portion when the flange of the I-beam has a first thickness, and wherein the hemispherical shaped portion is configured to orient the pivot axis extending upward through the screw at a second different angle with respect to the flat portion to secure the plate to the I-beam with the upper lip portion and the lower lip portion when the flange of the I-beam has a second different thickness.

In some aspects, the techniques described herein relate to an apparatus for supporting the hanging structure with an I-beam, wherein the plate has an elongated opening, wherein the hemispherical washer forms an internal thread around the aperture, wherein the screw extends via the elongated opening and via the aperture in the socket into the hemispherical washer, and wherein the hemispherical washer is configured to be engaged with the screw to secure the Self-aligning clamp to the plate and the I-beam.

In some aspects, the techniques described herein relate to an apparatus for supporting the hanging structure with an I-beam further including a locking bolt coupled with the screw and engaging the hemispherical washer.

In some aspects, the techniques described herein relate to an apparatus for supporting the hanging structure with an I-beam, wherein the plurality of fasteners includes an Self-aligning clamp with a flat portion, a lower lip portion and an upper lip portion, the upper lip portion extending away from one end of the flat portion, wherein an edge of the upper lip portion of one of the plurality of fasteners is configured to engage with a flange on one side of the I-beam, wherein an edge of the upper lip portion of another one of the plurality of fasteners is configured to engage with a flange on another side of the I-beam, wherein the lower lip portion extends away from the other end of the flat portion, and wherein an edge of the lower lip portion is configured to engage with a top surface of the plate.

In some aspects, the techniques described herein relate to an apparatus for supporting the hanging structure with an I-beam, wherein the lower lip portion includes an integrated stop portion configured to extend into one of the elongated apertures.

In some aspects, the techniques described herein relate to a method for supporting a rotating fan includes attaching a first cylindrical tube at one end to a rotating fan and attaching the first cylindrical tube at another end to a ceiling attaching structure. Forming in the cylindrical tube a plurality of threaded apertures between the rotating fan and the ceiling support structure. Attaching a cap at one end of one or more wires. Sliding an externally threaded ring integrally connected to a bolt head over the one or more wires such that at least a portion of the cap is inserted into the externally threaded ring. Screwing the rings into the threaded apertures by rotating the bolt heads to dispose the caps within the cylindrical tube such that the wires extend from the cap within the cylindrical tube through the bolt head and rings out from the tube. The wires are attached and extend from the tube to a fixed object to support the fan.

In some aspects, the techniques described herein relate to a method further includes attaching a turnbuckle to each of the wires. The turnbuckles are turned to tighten or loosen the wires, respectively.

In some aspects, the techniques described herein relate to a method, further including connecting a locknut on each end of the turnbuckle.

In some aspects, the techniques described herein relate to a method wherein a maximum or largest outer diameter of the cap is larger than a minimum inner diameter of the threaded ring.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIGS. 1A-1C are an isometric view, a front plan view and a side plan view of a fan supporting device for hanging a fan on a rail;

FIGS. 3A-3C are a front plan view, a side plan view and an exploded view of a fan supporting device shown in FIGS. 1A-1C for hanging a fan on a rail using a single plate;

FIGS. 4A-4C are a front plan view, a side plan view and a partially exploded view, of a fan supporting device for hanging a fan on an I-beam;

FIG. 7A is a side view of the guide wire shown in FIG. 6;

FIG. 7B is a top view of the bullet shown in FIG. 6;

FIG. 7C is cross sectional view of the bullet shown in FIG. 7B; and

FIG. 7D is a cross sectional view of the bullet shown in FIG. 7C with a cap and guidewire inserted therein.

DETAILED DESCRIPTION

Figure 2:
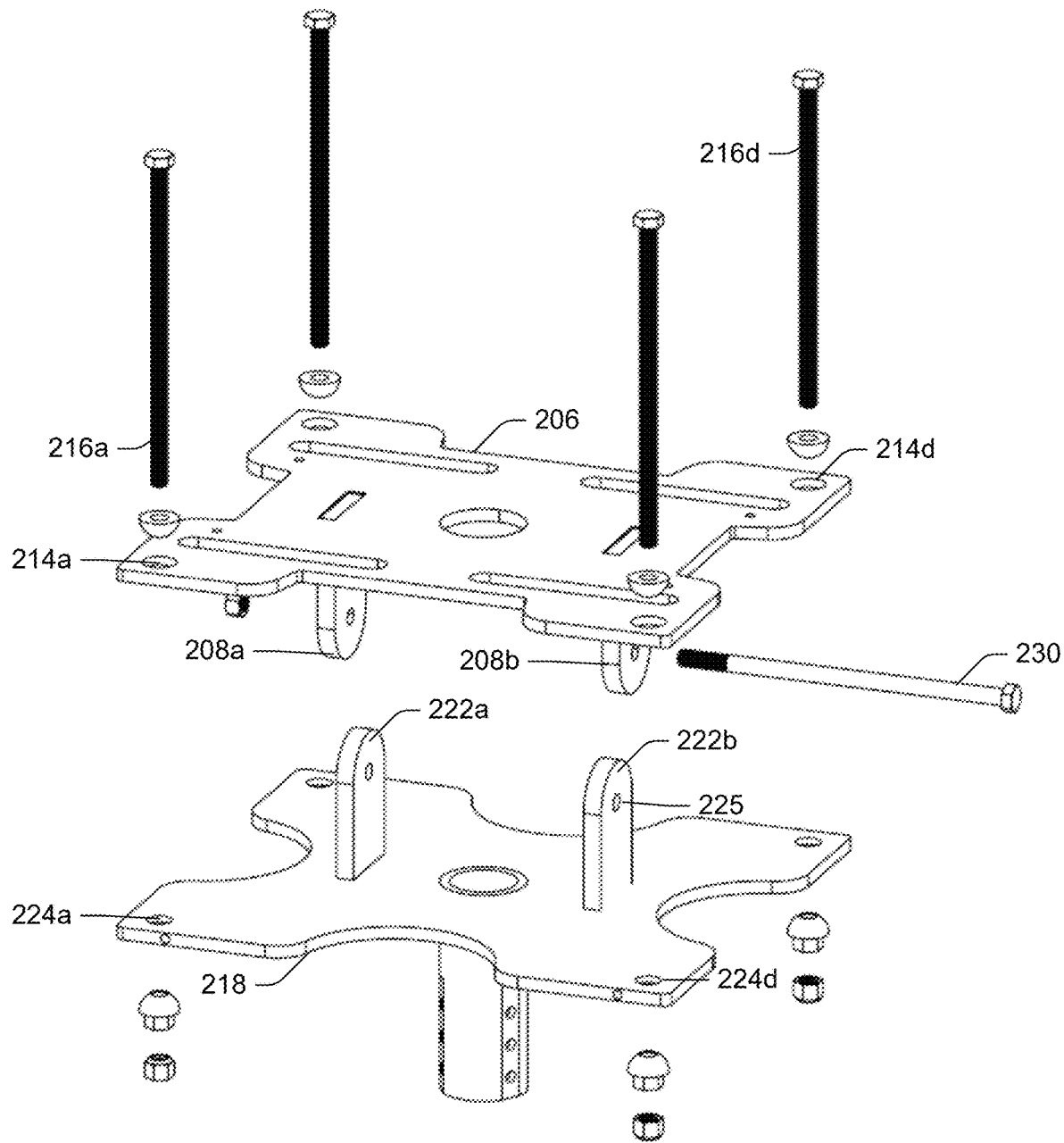
FIG. 2 is an exploded view of plates of the fan supporting device shown in FIGS. 1A-1C.

Referring to FIGS. 1A-1C, there is shown fan support device 100 that includes a rotating fan 102 (or any a hanging structure, such as a light fixture, exercise equipment, picture frame, sculpture, cooling device, etc.) attached at one end of a cylindrical tube 104. Tube 104 has a cylindrical lip 105 that wraps around tube 104 one end to support rotating fan 102. Further details of cylindrical tube 104 are described in connection with FIGS. 6, and 7A-7D.

Referring to FIGS. 1A-C and 2, a ceiling attaching structure is attached at the other end (another end) of tube 104 distal from the rotating fan 102. The fan support device 100 includes a flat plate 106 (plate 206 in FIG. 2) coupled with flat plate 118 that connects to a ceiling attaching structure, such as a beam or a rail as described herein. Flat plate 106 forms elongated openings 109a-d (also referred to apertures), with openings 109a and 109b extending in a first line, and openings 109c and openings 109d extending in a second line such that the first line is parallel to the second line.

Referring to FIG. 1, slidable fastener 110a, slidable fastener 110b, slidable fastener 110c, and slidable fastener 110d (that includes a screw, bolt and multiple washers) are fed through one of multiple elongated openings 109a-n in plate 106 to engage with a lip 112 of a rail 103 to secure rail 103 to plate 106. In one implementation, a washer and bolt 107 reside in rail 103. One of screws of fasteners 110a-d is fed though a washer and one of the elongated openings 109a (also referred to as elongated apertures), and elongated openings 109b-n into the washer and bolt that reside in the rail 103. Referring to FIGS. 1A-1C and 2, plate 106 (206 in FIG. 2) forms circular aperture 114a, circular aperture 114b, circular aperture 114c, and circular aperture 114d (214a-d in FIG. 2) therein to receive connectors 116a-d (216a-d in FIG. 2).

Flat plate 118 (plate 218 of FIG. 2) is coupled with a cylindrical tube 120 that extends perpendicularly away therefrom. Tube 120 receives and retains the cylindrical tube 104. Flat plate 118 has tongue 122a and tongue 122b (tongue 222a and tongue 222b of FIG. 2) extending perpendicular to flat plate 118 and engages with tongue 108a and tongue 108b (tongue 208a and tongue 208b of FIG. 2) with connector 130 (connector 230 of FIG. 2) (exemplary connector 130 includes a screw). Flat plate 118 forms aperture 124a, and apertures 124b-d to receive fastener 110a that extend via forms circular apertures 114a-d to engage adjacent a distal end of connector 116a, and connectors 116b-d. Fasteners 110b-d (e.g., screws) extend through openings 109a-d into rail 103.

Tongues 108a-n and tongues 122a-n each form an opening 125 (opening 225 of FIG. 2). The tongues 108a-b engage with the tongues 122a-b respectively by each receiving connector 130 that extends through the openings 125 of tongues 108a-b and tongues 122a-b.

Each of connectors 116a-d includes a screw and a bolt. The bolts of the plurality of connectors 116a-d engage with the flat plate 118 and a head of a screw on connectors 116a with plate 106. Bolts can be tightened or loosened on the screw to flat plate 106 and flat plate 118 about connector 130 to change an angle of a plane of a top surface of flat plate 118 with respect to an angle of a plane of a top surface of flat plate 106.

Aperture 132a, aperture 132b-n, and aperture 134a and apertures 134b-n are formed in tube 104 and tube 120, respectively. Apertures 132a-n, and apertures 134a-n align when tube 104 is inserted into tube 120. A pin (not shown) may be inserted at different location of the one or more of the aligned apertures 132a-n and 134a-n to change the distance between fan 102 and rail 103.

Referring to FIGS. 3A-3C, there is shown fan support device 300, using a single plate 306 (plate 106 of FIG. 1) that connects to rails 313 (rail 103 as described in FIG. 1). Plate 306 is coupled with a cylindrical tube 320 that extends perpendicularly away therefrom. Tube 320 receives and retains the cylindrical tube 304 (Tube 104 of FIG. 1) that holds a fan (not shown).

Referring to FIGS. 4A-4C, there is shown fan support device 400, that is like fan support device 100 as described in FIG. 1, with connecting plate 406 (plate 106 of FIG. 1) connected to I-beam 413 using slidable fastener 408a, slidable fastener 408b, slidable fastener 408c and slidable fastener 408d (each respectively includes screw 410a, screw (not shown), screw 410c, screw 410d, bolt 414a, bolt 414c and bolt 414d, regular washer 416a, regular washers 416c-d, hemispherical washer 418a, hemispherical washer (not shown), hemispherical washer 418c, self-aligning clamp 418d, self-aligning clamp 434a, self-aligning clamp 434c, and self-aligning clamp 434d (also individually referred to as an L-shaped bracket)). Screws 410a-410d are each fed via regular washers 416a-d through one of multiple elongated openings 409a (and opening 409b, opening 409c and opening 409d) in plate 106 (and via an aperture in hemispherical washers 418a-d and self-aligning clamps 434a-d) to couple with bolt 414a, and bolt 414-d. Self-aligning clamp 434a, self-aligning clamp 434c, and self-aligning clamp 434d engage with a I-beam flange 412 of I-beam 413 to secure connecting plate 406 to I-beam 413.

Figure 5A:
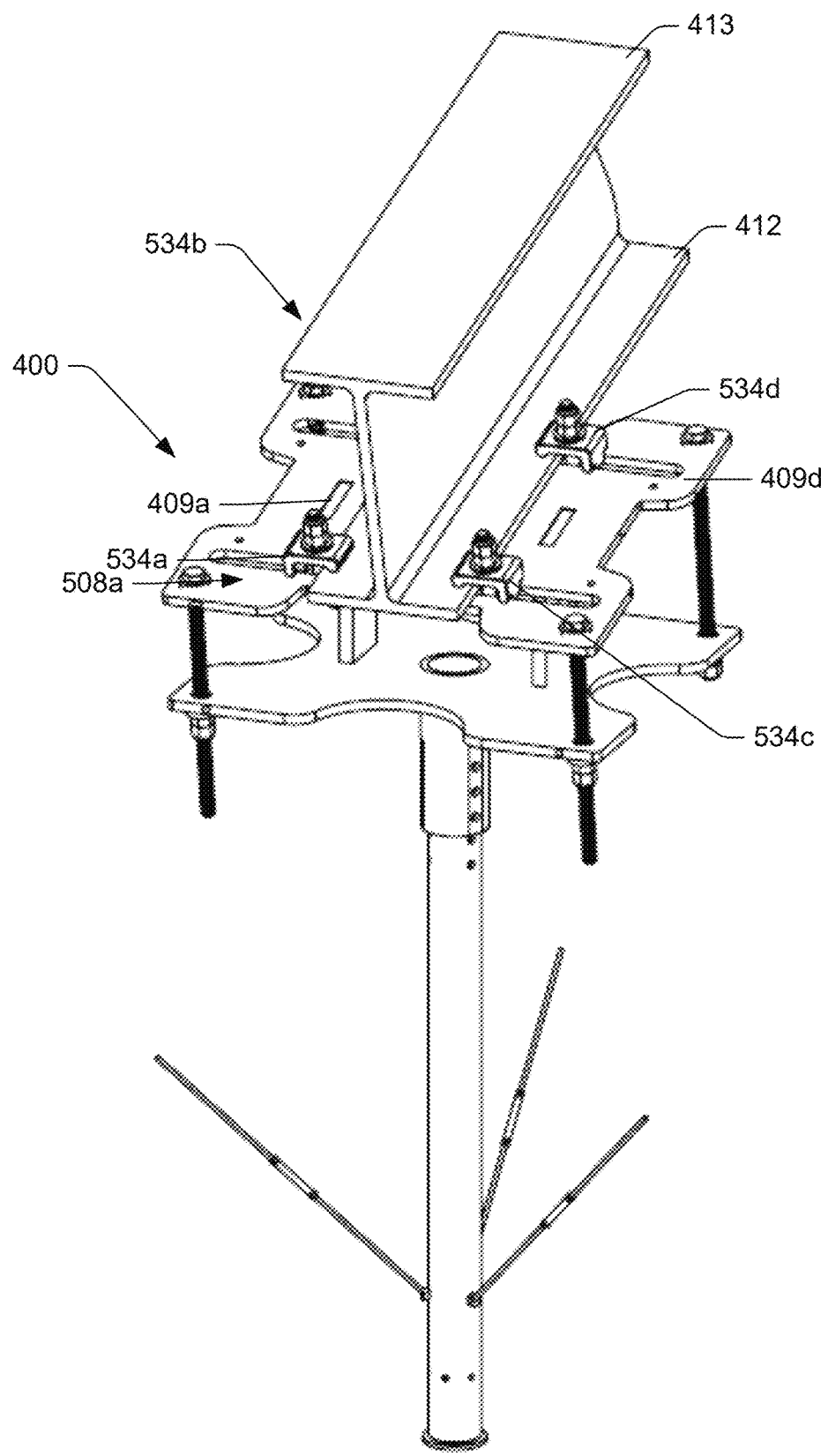
FIG. 5A is an isometric view of the fan supporting device shown in FIGS. 4A-4C.

Referring to FIG. 5A, fasteners 508a, and fasteners 508b-d (Slidable fastener 408a, and slidable fasteners 408b-d of FIG. 4C) may extend (with a screw) via elongated openings 409a-d and openings in self-aligning clamp 534a, self-aligning clamp 534b, self-aligning clamp 534c and self-aligning clamp 534d to (also individually referred to as an L-shaped bracket) engage I-beam flange 412 of I-beam 413 with connecting plate 406.

Figure 5B:
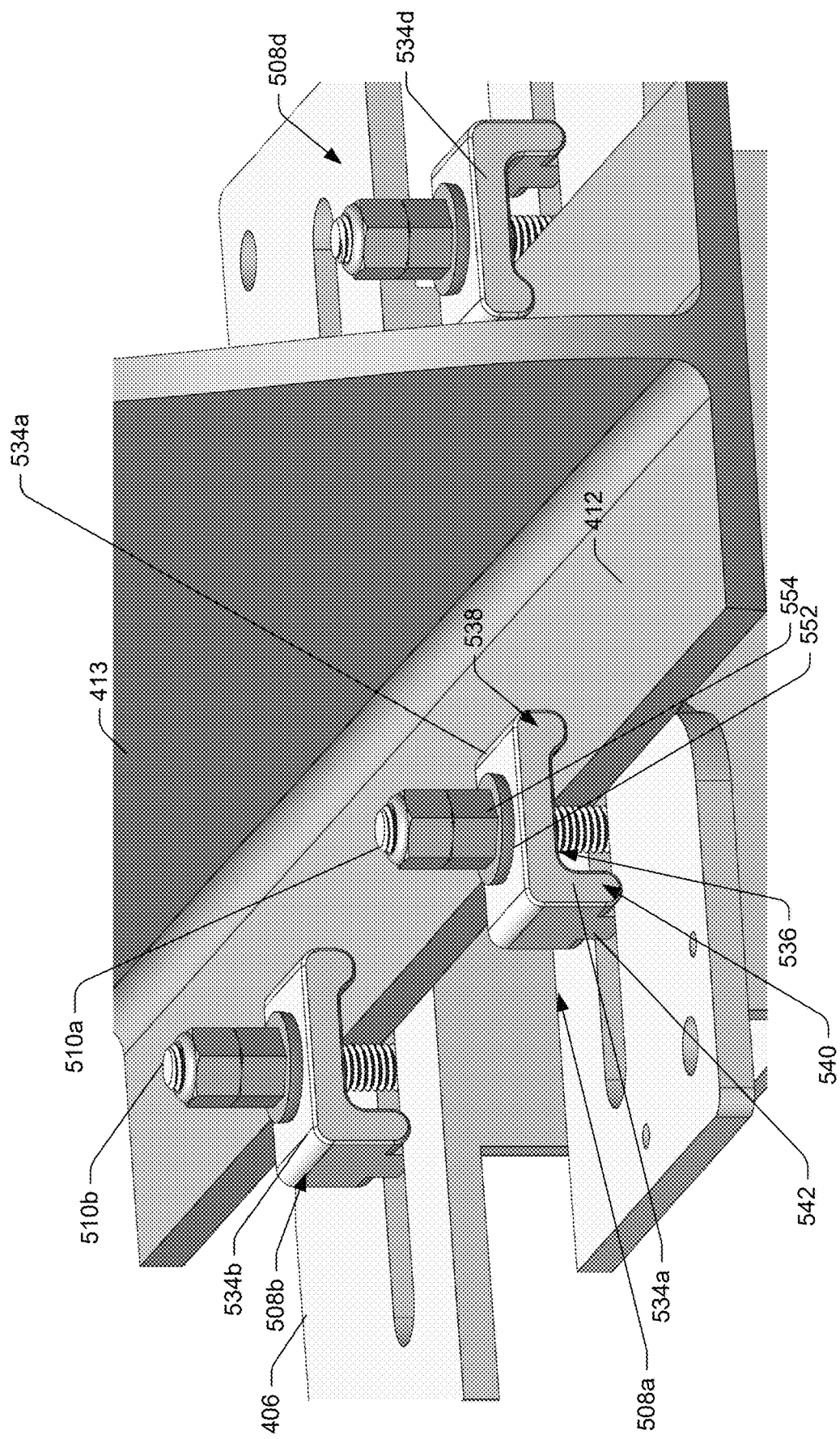
FIG. 5B is an isometric view of the novel Self-aligning clamp connecting the connecting plate to a flange of the I-beam shown in FIG. 5A.

Referring to FIG. 5B, there are shown further details of fasteners 508a-d. Referring to FIGS. 5A and 5B, exemplary fastener 508a (and fastener 508b) includes Self aligning clamp 534a coupling connecting plate 406 with I-beam flange 412 of I-beam 413. Self-aligning clamp 534a includes a flat portion 536 (with a flat upper surface and a flat bottom surface with a plane extending along the flat upper surface and another plane extending along the flat bottom surface), an upper lip portion 538 and a lower lip portion 540. Upper lip portion 538 and lower lip portion 540 each have an outer edge. Fastener 508a and fastener 508b includes screw 510a and screw 510b (which may be threaded at one end) respectively. Upper lip portion 538 and lower lip portion 540 extend perpendicularly away from the plane of the flat bottom surface in a same direction on the same side of flat portion 536, with lower lip portion 540 outer edge extending further away from the plane of the lower surface of flat portion 536 than upper lip portion 538 outer edge extends away from the plane of the lower surface of flat portion 536.

Self-aligning clamp 534a (and self-aligning clamps 534b-d) includes an integrated stop portion 542. Stop portion 542 extends away from and parallel to lower lip portion 540 (perpendicular to the plane extending through a lower surface of flat portion 536) into elongated opening 544 (multiple elongated opening 409a, and elongated openings 409b-d of FIGS. 4A-4C) of connecting plate 406. Stop portion 542 has a distal portion with a width slightly less than the width of multiple elongated openings 409a-d and has a width less than a width of lower lip portion 540. Stop portion 542 prevents Self aligning clamp 534a from sliding outside of elongated opening 544 and prevents self-aligning clamp 534a (and self-aligning clamps 534b-d) from rotating in elongated opening 544 while enabling Self aligning clamp 534a (and self-aligning clamps 534b-d) to slide along elongated opening 544.

Figure 5C:
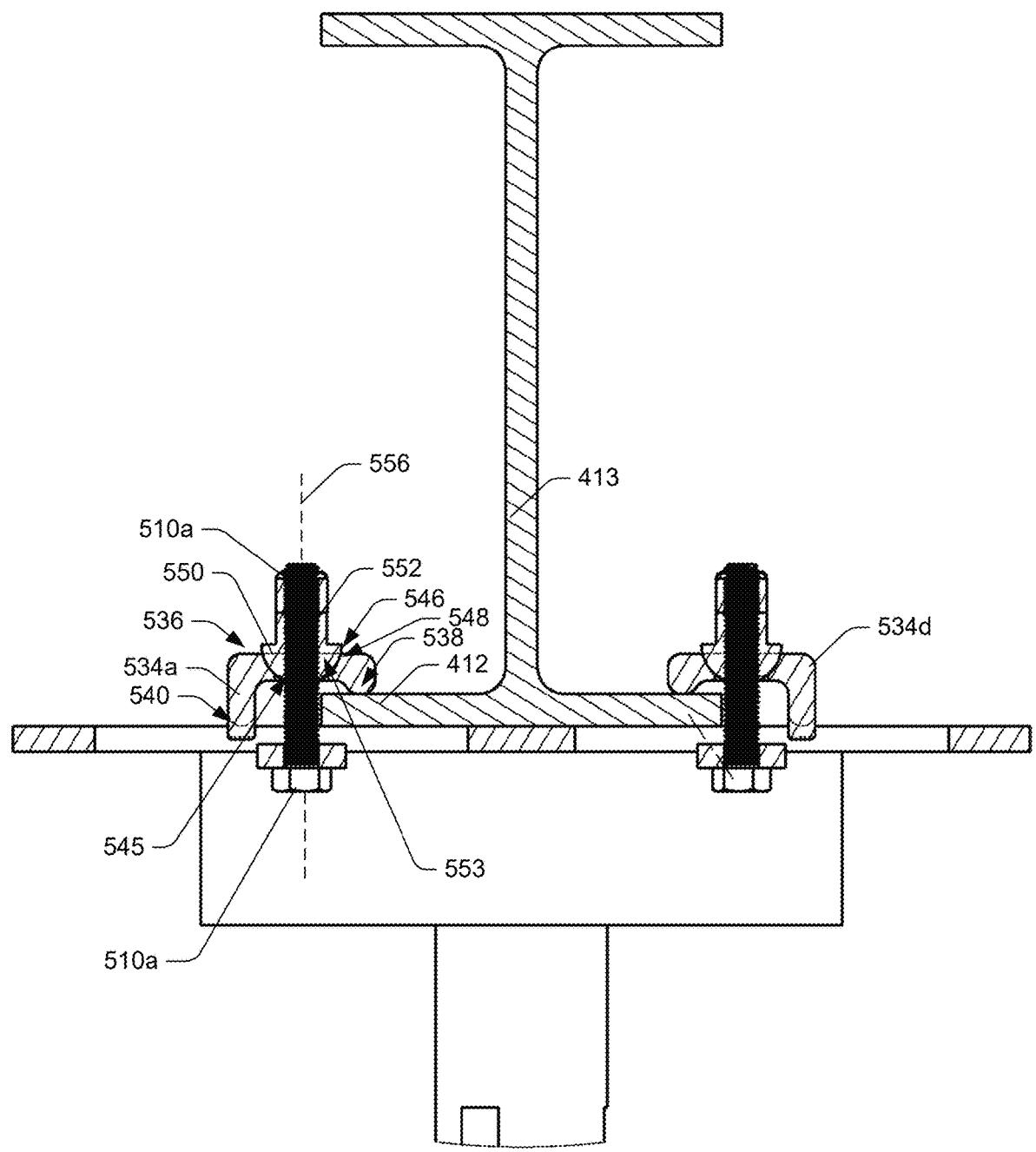
FIG. 5C is a side plan view of a self-aligning clamp shown in FIG. 5B.

Referring to FIG. 5C, there is shown a side cutout view of Self aligning clamp 534a. Flat portion 536 of Self aligning clamp 534a (and self-aligning clamp 534d) includes a bowl-shaped cutout section or socket 546 having inwardly recessed walls 548 in which a hemispherical washer 550 (hemispherical washer 418a of FIGS. 4A-4C) resides. Hemispherical washer 550 preferably includes a ridge section (referred to herein as integrated cap 552) with a flat top surface integrally connected to a hemispherical section 553

(also referred to herein as a hemispherical shaped portion). Cap 552 may be hexagonal shaped so that it may be turned on screw 510a using a tool. Socket 546 and hemispherical washer 550 form an opening 545 to receive screw 510a.

Hemispherical washer 550 is configured to pivot within cutout section 546 and is prevented from rotating by stop portion 542. Hemispherical washer 550 pivots in socket 546 of self-aligning clamp 534a to orient of an axis 556 extending upward through the screw 510a at a first angle with respect to a plane of the top surface of flat portion 536 to secure the connecting plate 406 to the I-beam 413 with the outer edge of upper lip portion 538 and the outer edge of lower lip portion 540 when the I-beam flange 412 has a first thickness. When I-beam flange 412 has a different thickness see axis 556' of screw 510a and screw 510d in FIG. 5D.

Referring to FIG. 5B and FIG. 5C, when attaching connecting plate 406 to I-beam 413, Self-aligning clamp 534a is placed on I-beam 413 so that upper lip portion 538 contacts I-beam flange 412 and lower lip portion 540 contacts a top surface of connecting plate 406. Screw 510a (also referred to as a fastener) is fed through a washer (washer 416a of FIGS. 4A-4C), elongated opening 544, an aperture in socket 546 and an opening 545 in hemispherical washer 550 through integrated cap 552 (or a washer may be used in place of integrated cap 552) and into locking bolt 554.

Locking bolt 554 and integrated cap 552 (also referred to as a bolt head or bolt heads) may be rotated on screw 510a to tighten and hold fastener 508a to connecting plate 406 and I-beam flange 412. Before tightening fastener 508a (as well as fasteners 508b-d), self-aligning clamp 534a (as well as self-aligning clamps 534b-d) including screw 510a may slide along one of elongated openings 544 in connecting plate 406 to attach the upper lip portion 538 to I-beam flange 412. As the integrated cap 552 is torqued, the self-aligning clamp 534a undergoes elastic deformation that forces the upper lip portion 538 into an engagement with the I-beam flange 412. Greater pressure is then applied to the lower lip portion 540 of the Self aligning clamp 534a. Since Self aligning clamp 534a and self aligning clamp 534d oppose each other, the upper lip portion 538 of Self aligning clamp 534a and Self aligning clamp 534d are forced into the I-beam flange 412 improving immobility and reducing the probability of fan support device 400 loosening from I-beam 413.

Figure 5D:
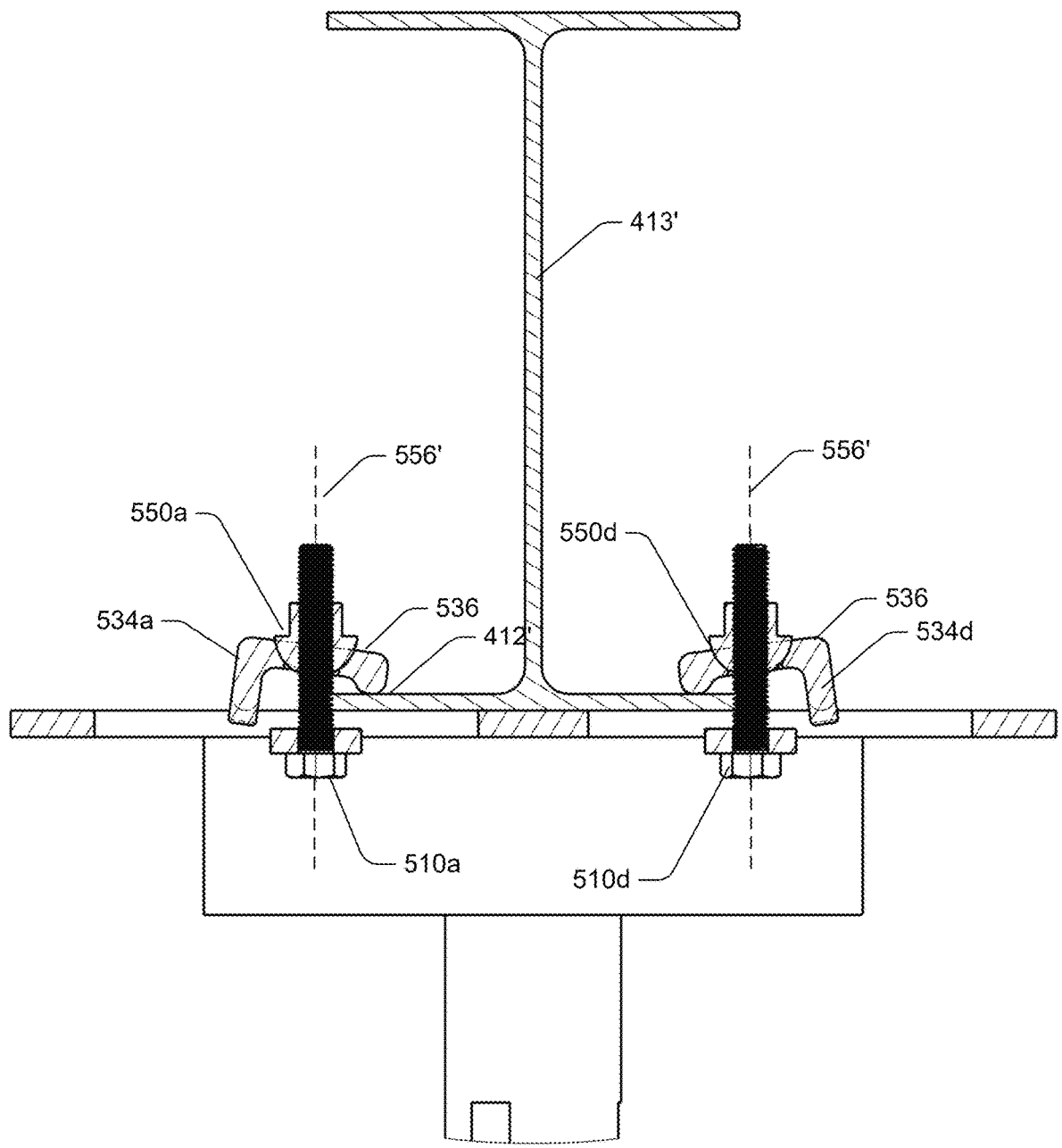
FIG. 5D is a side plan view of a self-aligning clamp shown in FIG. 5C in an alternate configuration with a thinner I-beam.

Referring to FIG. 5D, self-aligning clamp 534a is placed on a thinner I-beam 413' with a thinner I-beam flange 412' than the I-beam flange 412 of I-beam 413 shown in FIG. 5C. When placed on the thinner I-beam flange 412', Self-aligning clamp 534a on one side of L-beam 413' and Self aligning clamp 534d on another side of L-beam 413' are slid on elongated openings 544 and pivot with respect to hemispherical washer 550a and 550d, respectively. When the I-beam flange 412' of I-beam 413' has a second different thickness than I-beam flange 412 (FIG. 5C), the hemispherical washer 550 pivots in socket 546 of self-aligning clamp 534a (and self-aligning clamp 534d) to orient the axis 556' extending upward through the screw 510a (and screw 510d) at a second different angle with respect to the a plane of the upper surface of flat portion 536 to secure the connecting plate 406 to the I-beam 413'.

Figure 6:
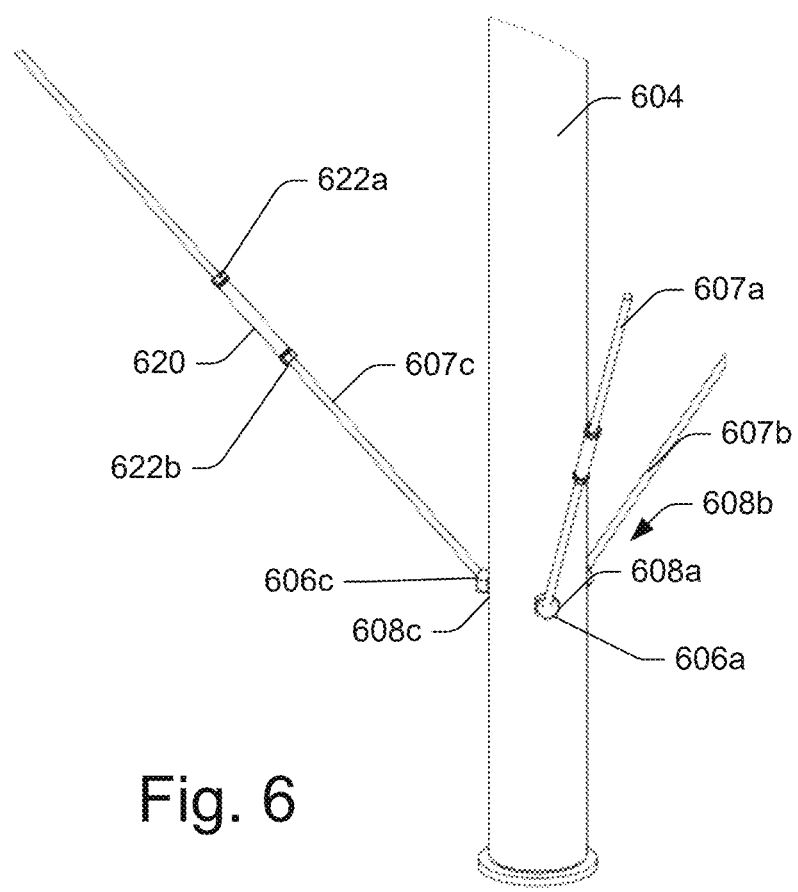
FIG. 6 is a plan view of the tube of the fan supporting device shown in FIGS. 1A-1C with Guidewires mounted on the tube.

Referring to FIG. 6, there is shown a cylindrical tube 604 (Tube 104 of FIG. 1). As described in FIG. 1, the cylindrical tube 604 (cylindrical tube 604 are also referred to herein as an elongated member, or elongated members) attaches at one end to a rotating fan and attaches at its other end to a ceiling attaching structure as previously described.

Threaded aperture 608a, threaded aperture 608b and threaded aperture 608c (referred to collectively as threaded apertures) are formed in the cylindrical tube 604 between the rotating fan and the ceiling support structure. Referring to FIGS. 7A-D, bullet 706 is formed that includes an externally threaded ring 710 integrally connected at one end with a hollow hex bolt head (referred to herein as bolt 712).

Referring to FIG. 7A, a guidewire 707 having an integrally connected cap 708 at one end (FIGS. 7A and 7D) is fed through a bullet 706. Cap 708 is preferably soldered, glued or crimped to one end of guidewire 707, and is spherically shaped tapering to a diameter less than the maximum inner diameter of the ring 710. Preferably guidewire 707 terminates into cap 708. Cap 708 tapers from a maximum outer diameter larger than the minimum inner diameter of ring 710 but has a smaller a maximum outer diameter larger than the ring 710 outer diameter. Bolt 712 minimum outer diameter is larger than ring 710 maximum outer diameter but has an inner diameter smaller than cap 708 minimum diameter and is larger than the guidewire 707 maximum outer diameter.

Referring to FIGS. 6 and 7A-7D, bullet 606a, bullet 606b and bullet 606c (Bullet 706 of FIGS. 7A-7D) slide over each of the guidewire 607a, guidewire 607b and guidewire 607c with a tapered end of cap 708 inserting into ring 710 of bullets 606a-c. Bullets 606a-c are screwed into aperture 608a, aperture 608b and aperture 608c by rotating head of bolt (bolt head) 712, such that the bolt is stopped and does not screw into cylindrical tube 604. After screwing the bullets 606a-c into the apertures 608a-c, caps 708 of each bullets 606a-c are disposed within the cylindrical tube and the other end of the guide wires 607a-c are disposed distal from the cylindrical tube 604. The distal end of guide wires 607a-c can be attached to a fixed object to support (e.g., prevent movement) cylindrical tube 604 and the fan.

Referring to FIG. 6, a turnbuckle 620 may be attached to each of the wires 607a-c with a locknut 622a and 622b on each end of the turnbuckle 620. The turnbuckle 620 may be turned to tighten or loosen each of the guidewires 707 from the fixed object, respectively.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion but should be defined by the appended claims.

What is claimed is:

1. An apparatus for supporting a hanging structure with an I-beam comprising:
   at least one elongated member;
   a plate that is coupled with one end of the at least one elongated member, the at least one elongated member configured to extend perpendicular to the plate and configured to receive and retain the hanging structure with the I-beam at another end of the at least one elongated member, the plate forming a plurality of elongated apertures configured to receive a plurality of fasteners to secure the plate to the I-beam; and
   at least one of the plurality of fasteners including a self-aligning clamp with a first portion that includes a socket forming an aperture configured to receive a screw coupled with a partially hemispherical washer, the partially hemispherical washer having a hemispherical shaped portion that is configured:

a) to be engaged with the socket that is forming the aperture, b) to be pivoted within the socket that is forming the aperture to orient an axis extending upward through the screw at a first angle with respect to a plane extending tangentially along a top surface of the first portion and to position the plate at a first distance from a point where the hemispherical shaped portion engages with the socket to secure the plate to a flange of the I-beam having a first thickness, and c) to be pivoted within the socket that is forming the aperture to orient the axis extending upward through the screw at a second different angle with respect to the plane extending tangentially along the top surface of the first portion and to position the plate at a second distance from a point where the hemispherical shaped portion engages with the socket to secure the plate to a flange of the I-beam having a second different thickness.

2. The apparatus for supporting the hanging structure with the I-beam as recited in claim 1, wherein the at least one of the plurality of fasteners includes, a lower lip portion and an upper lip portion, the upper lip portion extending away from one end of the first portion, an edge of the upper lip portion configured to engage with the flange of the I-beam, the lower lip portion extending away from another end of the first portion and an edge of the lower lip portion configured to be engaged with a top surface of the plate.

3. The apparatus for supporting the hanging structure with the I-beam as recited in claim 2, wherein the lower lip portion and the upper lip portion extend in a same direction perpendicularly away from a plane extending along a lower surface of the first portion.

4. The apparatus for supporting the hanging structure with the I-beam as recited in claim 3, wherein the edge of the lower lip portion extends away from the first portion at a distance greater than the edge of the upper lip portion.

5. The apparatus for supporting the hanging structure with the I-beam as recited in claim 3, wherein the lower lip portion includes an integrated stop portion configured to extend into one of the plurality of elongated apertures.

6. The apparatus for supporting the hanging structure with the I-beam as recited in claim 1, wherein the plurality of fasteners includes a flat portion, a lower lip portion and an upper lip portion, the upper lip portion extending away from one end of the flat portion, wherein an edge of the upper lip portion of one of the plurality of fasteners is configured to be engaged with a flange on one side of the I-beam, wherein an edge of the upper lip portion of another one of the plurality of fasteners is configured to be engaged with a flange on another side of the I-beam, wherein the lower lip portion extends away from another end of the flat portion, and wherein an edge of the lower lip portion is configured to be engaged with a top surface of the plate.

7. An apparatus for supporting a hanging structure with an I-beam comprising:

at least one elongated member configured to attach the hanging structure at one end of the at least one elongated member; and a plate coupled with another end of the at least one elongated member, the at least one elongated member configured to extend perpendicular with respect to the plate and configured to receive and retain the hanging structure at another end of the at least one elongated member, the plate forming a plurality of elongated apertures configured to receive a plurality of fasteners to secure the plate to the I-beam, wherein at least one of the plurality of fasteners includes a self-aligning clamp with a flat portion, a lower lip portion and an upper lip portion, the upper lip portion extending away from one end of the flat portion, an edge of the upper lip portion configured to engage with a flange of the I-beam, the lower lip portion extending away from another end of the flat portion and an edge of the lower lip portion configured to be engaged with a top surface of the plate, wherein the flat portion of the self-aligning clamp includes a socket configured to receive a hemispherical washer, the socket and the hemispherical washer forming an aperture to receive a screw, wherein the hemispherical washer includes a hemispherical shaped portion that engages with the socket, and wherein the hemispherical shaped portion is configured to pivot with respect to the flat portion within the socket, wherein the hemispherical shaped portion that engages with the socket is configured to orient a pivot axis extending upward through the screw at a first angle with respect to a plane extending along a top surface of the flat portion to secure the plate to the I-beam with the upper lip portion and the lower lip portion engaging the flange of the I-beam having a first thickness, and wherein the hemispherical shaped portion is configured to orient the pivot axis extending upward through the screw at a second different angle with respect to the plane of the flat portion to secure the plate to the I-beam with the upper lip portion and the lower lip portion engaging the flange of the I-beam having a second different thickness.

8. An apparatus for supporting a hanging structure with an I-beam comprising:

at least one elongated member configured to attach the hanging structure at one end of the at least one elongated member;

a plate coupled with another end of the at least one elongated member, the at least one elongated member configured to extend perpendicular with respect to the plate and configured to receive and retain the hanging structure at another end of the at least one elongated member, the plate forming a plurality of elongated apertures configured to receive a plurality of fasteners to secure the plate to the I-beam, wherein at least one of the plurality of fasteners includes a self-aligning clamp with a flat portion, a lower lip portion and an upper lip portion, the upper lip portion extending away from one end of the flat portion, an edge of the upper lip portion configured to engage with a flange of the I-beam, the lower lip portion extending away from another end of the flat portion and an edge of the lower lip portion configured to be engaged with a top surface of the plate, wherein the flat portion of the self-aligning clamp includes a socket that is configured to receive a hemispherical washer, the socket and the hemispherical washer forming an opening to receive a screw, wherein the hemispherical washer forms an internal thread around the opening, wherein the screw extends via an elongated opening and via the opening in the socket into the opening in the hemispherical washer, and wherein the hemispherical washer is configured to be engaged on the screw to secure the self-aligning clamp to the plate and the I-beam.

9. An apparatus for supporting a hanging structure with an I-beam comprising:
- at least one elongated member configured to attach the hanging structure at one end of the at least one elongated member; and
- a plate coupled with another end of the at least one elongated member, the at least one elongated member configured to extend perpendicular with respect to the plate and configured to receive and retain the hanging structure at another end of the at least one elongated member, the plate forming a plurality of elongated apertures configured to receive a plurality of fasteners to secure the plate to the I-beam;
- wherein at least one of the plurality of fasteners includes a self-aligning clamp with a flat portion, a lower lip portion and an upper lip portion, the upper lip portion extending away from one end of the flat portion, an edge of the upper lip portion configured to be engaged with a flange of the I-beam, the lower lip portion extending away from another end of the flat portion and an edge of the lower lip portion configured to be engaged with a top surface of the plate;
- wherein the flat portion of the self-aligning clamp includes a socket configured to receive a hemispherical washer;
- wherein the hemispherical washer forms an opening to receive a screw;
- wherein the hemispherical washer forms an internal thread around the opening,
- wherein the screw extends via one of the plurality of elongated apertures and via a second opening in the socket into the hemispherical washer, wherein the hemispherical washer is configured to rotate with respect to the screw to secure the self-aligning clamp to the plate and the and wherein a locking bolt couples with the screw and engages to the hemispherical washer.

* * * * *